US010409135B2

(12) United States Patent
Zid et al.

(10) Patent No.: US 10,409,135 B2
(45) Date of Patent: Sep. 10, 2019

(54) DEVICE AND METHOD FOR CONTROLLING THE TEMPERATURE OF A MULTI-RESONANT OPTOELECTRONIC DEVICE

(71) Applicant: Commissariat à l'Energie Atomique et aux Energies Alternatives, Paris (FR)

(72) Inventors: Mounir Zid, Grenoble (FR); Yvain Thonnart, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/934,194

(22) Filed: Nov. 6, 2015

(65) Prior Publication Data

US 2016/0131959 A1    May 12, 2016

(30) Foreign Application Priority Data

Nov. 7, 2014  (FR) ...................................... 14 60766
Nov. 5, 2015  (EP) .................................... 15193295

(51) Int. Cl.
*G02F 1/225*    (2006.01)
*G02B 6/293*    (2006.01)
*G02F 1/01*     (2006.01)

(52) U.S. Cl.
CPC .......... *G02F 1/225* (2013.01); *G02B 6/29338* (2013.01); *G02B 6/29398* (2013.01); *G02F 1/011* (2013.01); *G02F 1/0123* (2013.01); *G02F 1/0147* (2013.01); *G02F 2203/15* (2013.01)

(58) Field of Classification Search
None
See application file for complete search history.

(56) References Cited

U.S. PATENT DOCUMENTS

| 2009/0161113 | A1* | 6/2009 | Chen ................. G02B 6/12007 356/477 |
| 2012/0057866 | A1 | 3/2012 | Mclaren et al. |
| 2012/0105177 | A1* | 5/2012 | McLaren .............. H01P 1/2084 333/234 |
| 2012/0301068 | A1 | 11/2012 | Meade et al. |

(Continued)

OTHER PUBLICATIONS

Ashok V Krishnamoorthy et al: "Exploiting CMOS Manufacturing to Reduce Tuning Requirements for Resonant Optical Devices", IEEE Photonics Journal, IEEE, USA, vol. 3, No. 3. Jun. 1, 2011, pp. 567-579.

(Continued)

*Primary Examiner* — Chad H Smith
(74) *Attorney, Agent, or Firm* — Kevin R. Erdman; Brannon Sowers & Cracraft PC

(57) ABSTRACT

The present invention involves a method of controlling at least one first element (22) for heating a multi-resonant optical device (10), automatically alternating between at least a first mode and a second mode, wherein, in the first mode, the first heating element is controlled by a first feedback loop (20) to lead the optical device to operate at a first resonance peak and wherein, at least during part of the second mode, the first feedback loop is made diverging to lead the optical device to operate at a second resonance peak.

17 Claims, 7 Drawing Sheets

(56) References Cited

U.S. PATENT DOCUMENTS

2014/0110572 A1* 4/2014 Li .................. G01J 1/0209
250/227.23
2017/0010485 A1* 1/2017 Amberg .............. G02F 1/0121

OTHER PUBLICATIONS

Zhang Yu et al: "Towards Adaptively Tuned Silicon Microring Resonators for Optical Networks-on-Chip Applications", IEEE Journal of Selected Topics in Quantum Electronics, IEEE Service Center, Piscataway, NJ, US, vol. 20, No. 4. Jul. 1, 2014, pp. 1-14.
Kishore Padmaraju et al: "Resolving the thermal challenges for silicon microring resonator devices", Nanophotonics, Aug. 1, 2014, pp. 269-281.
Linjie Zhou et al: "Tunable Vernier Microring Optical Filters With p-i-p-Type Microheaters", IEEE Photonics Journal, IEEE, USA, vol. 5, No. 4, Aug. 1, 2013, p. 6601211.
Yan Zheng et al: "Power-efficient calibration and reconfiguration for Optical Network-on-Chip", IEEE/OSA Journal of Optical Communications and Networking, IEEE, USA, vol. 4, No. 12, Dec. 1, 2012, pp. 955-966.
Ma Yangjin et al: "Silicon microring based modulator and filter for high speed transmitters at 1310 nm", 2014 Optical Interconnects Conference, IEEE, May 4, 2014, pp. 23-24.
Xiaoliang Zhu et al: "Fast Wavelength Locking of a Microring Resonator", IEEE Photonics Technology Letters, vol. 26, No. 23, Dec. 1, 2014.
Chen Sun et al: "A Monolithically-Integrated Chip-to-Chip Optical Link in Bulk CMOS", IEEE Journal of Solid-State Circuits, vol. 50, No. 4, Apr. 2015.
European Search Report for EP 15/193295, dated Mar. 23, 2016.
French National Institute of Industrial Property, Search Report for FR 14/60766, dated Jul. 17, 2015.

* cited by examiner

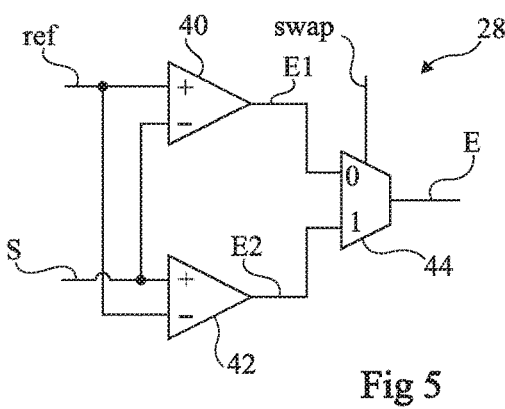
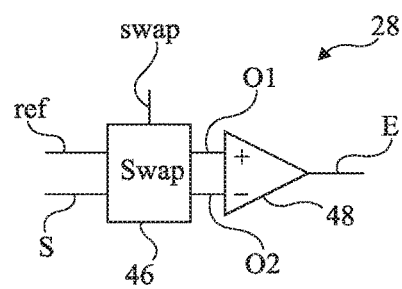
Fig 5          Fig 6
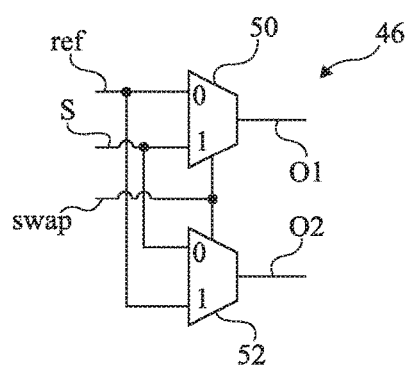
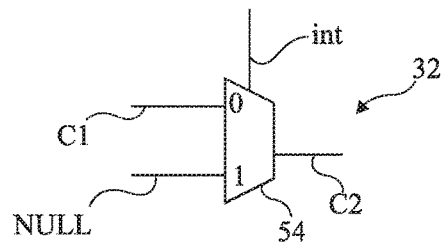
Fig 7          Fig 8
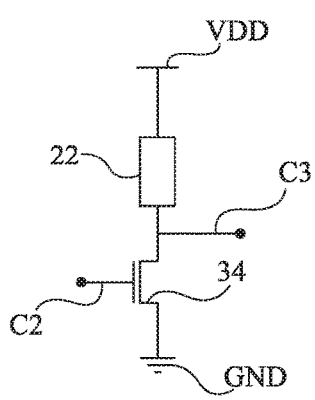
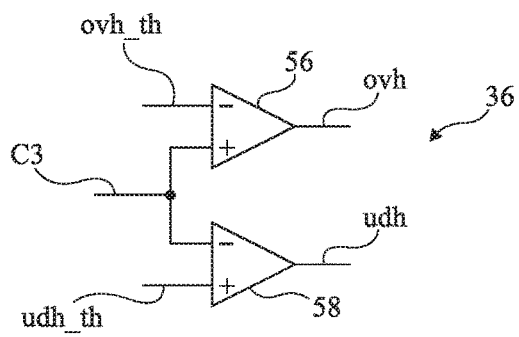
Fig 9          Fig 10

DEVICE AND METHOD FOR CONTROLLING THE TEMPERATURE OF A MULTI-RESONANT OPTOELECTRONIC DEVICE

CROSS-REFERENCE TO RELATED APPLICATIONS

The present application is a U. S. patent application Ser. No. 14/934,194 filed Nov. 6, 2015, which claims priority under 35 U.S.C. § 119(e) of French Patent Application Serial Number N° 14/60766, filed Nov. 7, 2014 and European Application Serial Number 15193295.1, filed Nov. 5, 2015, the disclosures of which are incorporated by reference herein.

BACKGROUND OF THE INVENTION

Field of the Invention

The present disclosure relates to a device and a method for controlling the temperature of a multi-resonant optoelectronic device, in particular comprising a ring-shaped optical microresonator.

Description of the Related Art

FIG. 1 shows an example of a ring-shaped microresonator 10 comprising first and second waveguides 12, 14 having a ring-shaped waveguide 16 arranged there between. An input light signal SInput is supplied at one end, called Input, of first waveguide 12. Optical coupling phenomena 12, 14, 16 may occur so that part of or an entire light signal SInput may be deviated by ring 16 towards second waveguide 14. Light signal SInput is then divided into a light signal SThrough emitted at the other end, called Through, of first waveguide 12, and a light signal SDrop emitted at one end, called Drop, of second waveguide 14. A possible light signal SAdd received at the other end, called Add, of second waveguide 14, may also be deviated towards ends Through and Drop of the ring microresonator.

FIG. 2 shows an example of a transfer function of microresonator 10 for end Drop and corresponds to the ratio of power PDrop of light signal SDrop to power PInput of light signal SInput according to wavelength $\lambda$ of optical signal SInput. The transfer function exhibits a plurality of resonance peaks 18, two resonant peaks being shown in FIG. 2. Interval FSR between two adjacent resonance peaks is called free spectral interval. The free spectral interval may be expressed in frequency or in wavelength. Resonance peaks 18 are obtained for each wavelength of input signal SInput for which the optical path of the light signal in ring 16 corresponds to the product of the refraction index of the guide and of an integer multiple k of the wavelength. Integer k is called order of the resonance.

According to the provided use of microresonator 10, the transfer function may in particular be modified by the application of a voltage across an electric junction at the level of ring-shaped waveguide 16.

An optoelectronic device may comprise a plurality of series-connected ring-shaped microresonators, the resonance peaks being offset from one microresonator to the other. Such a device enables, in particular, to implement a method of data transfer with a wave division multiplexing (WDM) where a plurality of signals at different wavelengths may be simultaneously transmitted.

Waveguides 12, 14, 16 of microresonator 10 may correspond to silicon tracks surrounded with silicon oxide. A disadvantage is that the refraction indexes of the materials forming waveguides 12, 14, 16 vary according to temperature. This causes a shift of the transfer function of microresonator 10 when the temperature of ring 16 varies.

FIG. 3 is a drawing similar to FIG. 2 and illustrates the shift of the transfer function of microresonator 10 towards large wavelengths when the temperature of ring 16 increases. This shift is called redshift. In particular, power PDrop obtained for wavelength $\lambda'$ is greater in FIG. 3 than in FIG. 2. Conversely, when the temperature of ring 16 decreases, the transfer function shifts towards short wavelengths. This shift is called blueshift.

There exist devices capable of maintaining the ring 16 of a microresonator 10 at a constant temperature to stabilize the transfer function of microresonator 10. A possibility is to provide a heating element close to ring-shaped waveguide 16 controlled by a control device so that the temperature of ring 16 remains substantially constant, for example to within 0.1-0.2° C.

However, in certain cases, particularly when the ambient temperature varies too much, it may not be possible to maintain the ring temperature at a substantially constant value, for example, to within 0.1-0.2° C. Further, the control of the heating element may cause a significant electric power consumption. Further, the heating element does not enable to cool down the ring if the ambient temperature exceeds the target temperature.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIGS. 5 to 10 are electric diagrams of embodiments of units of the control device of FIG. 4;

Figure 1:
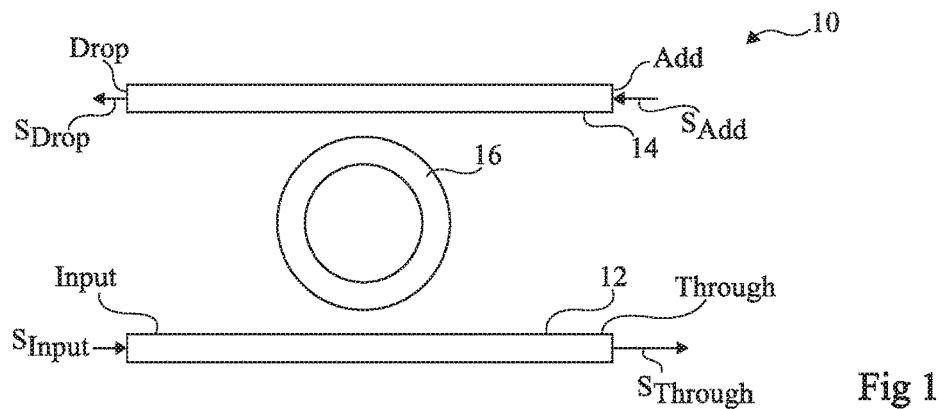
FIG. 1, previously described, shows an example of a ring-shaped optical microresonator.
Figure 2:
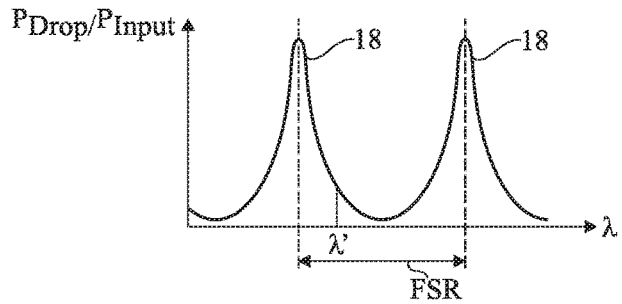
FIG. 2, previously described, shows an example of the transfer function of the microresonator of FIG. 1.
Figure 3:
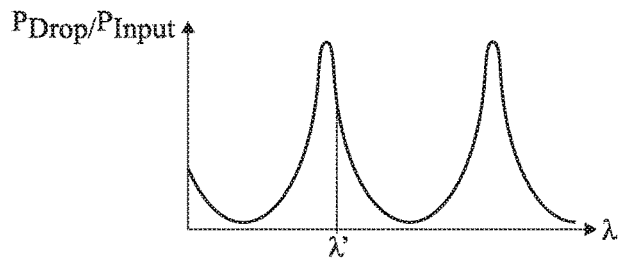
FIG. 3, previously described, illustrates the shift of the transfer function of FIG. 2 during a temperature rise.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below is/are not intended to be exhaustive or limit the invention to the precise form disclosed in the following detailed description. Rather, the embodiment is chosen and described so that others skilled in the art may utilize its teachings.

An embodiment aims at overcoming all or part of the disadvantages of known devices and methods for controlling at least one heating element used for the regulation of the temperature of multi-resonant optoelectronic devices.

Another embodiment aims at providing a device and a method for controlling at least one heating element of a multi-resonant optoelectronic device which is automated.

Another embodiment aims at providing a device and a method for controlling at least one heating element of a multi-resonant optoelectronic device accepting significant variations of the ambient temperature.

Another embodiment aims at providing a device and a method for controlling at least one heating element of a multi-resonant optoelectronic device having a decreased electric power consumption.

Thus, an embodiment provides a method of controlling a first heating element to heat a multi-resonant optical device, automatically alternating between at least a first mode and a second mode, wherein, in the first mode, the first heating element is controlled by a first feedback loop to make the optical device operate at a first resonance peak and wherein, at least during part of the second mode, the first feedback loop is made diverging to lead the optical device to operate at a second resonance peak.

According to an embodiment, the optical device comprises a first multi-resonant microresonator and, in the first mode, the first heating element is controlled by the first feedback loop to lead the first microresonator to operate at the first resonance peak.

According to an embodiment, at least during part of the second mode, the first feedback loop is made diverging to lead the first microresonator to operate at the second resonance peak.

According to an embodiment, the optical device further comprises a second multi-resonant microresonator and, in the second mode, a second heating element to heat the second microresonator is controlled to lead the second microresonator to operate at the second resonance peak.

According to an embodiment, the optical device comprises at least one first output capable of supplying a first optical signal, a first sensor being capable of supplying a first measurement signal representative of at least part of the power of the first optical signal. In the first mode, a first error signal equal to the difference between a first reference signal at a first level and the first measurement signal is determined and a first signal for controlling the first heating element is determined based on the first error signal.

According to an embodiment, at least during part of the second mode, the sign of the first error signal is inverted.

According to an embodiment, the switching from the first mode to the second mode is performed when the first control signal is lower than a first threshold or higher than a second threshold.

According to an embodiment, at least during part of the second mode, the first reference signal is set to a second level different from the first level.

According to an embodiment, in the first mode, the second heating element is controlled by a second feedback loop to make the second microresonator operate at a third resonance peak, possibly corresponding to the second resonance peak, and, in the second mode, the second feedback loop is made diverging to make the second microresonator operate at a fourth resonance peak, possibly corresponding to the first resonance peak.

According to an embodiment, the optical device comprises at least one second output capable of supplying a second optical signal, a second sensor being capable of supplying a second measurement signal representative of at least part of the power of the second optical signal. In the first mode, a second error signal equal to the difference between a second reference signal and the second measurement signal is determined and a second signal for controlling the second heating element is determined based on the second error signal.

According to an embodiment, when the switching from the first mode to the second mode is detected for the first microresonator, the second feedback loop is lead to operate in the second mode.

An embodiment also provides an optoelectronic device comprising a multi-resonant optical device, a first heating element to heat the optical device and a device for controlling the first heating element capable of automatically alternating between at least a first mode and a second mode, and comprising a first feedback loop capable, in the first mode, of controlling the first heating element to lead the optical device to operate at a first resonance peak, the control device being capable, at least during part of the second mode, of making the first feedback loop diverge to lead the optical device to operate at a second resonance peak.

According to an embodiment, the optical device comprises a first multi-resonant microresonator and, in the first mode, the first feedback element is capable of controlling the first heating element to make the first microresonator operate at the first resonance peak.

According to an embodiment, the optoelectronic device further comprises a second multi-resonant microresonator, the optoelectronic device comprising a second heating element to heat the second microresonator and, in the second mode, the control device is capable of controlling the second heating element to lead the second microresonator to operate at the second resonance peak.

According to an embodiment, the optical device comprises at least a first output capable of supplying a first optical signal, the control device comprising a first sensor capable of supplying a first measurement signal representative of at least part of the power of the first optical signal, and the control device comprises a first unit capable, in the first mode, of determining a first error signal equal to the difference between a first reference signal at a first level and the first measurement signal and a second unit capable of determining a first signal for controlling the first heating element based on the first error signal.

According to an embodiment, the first unit is capable, at least during part of the second mode, of inverting the sign of the first error signal.

According to an embodiment, the control device is capable of controlling the switching from the first mode to the second mode when the first control signal is lower than a first threshold or higher than a second threshold.

According to an embodiment, the control device is capable, at least during part of the second mode, of setting the first reference signal to a second level different from the first level.

According to an embodiment, the control device comprises a second feedback loop capable, in the first mode, of controlling the second heating element to lead the second microresonator to operate at a third resonance peak, possibly corresponding to the second resonance peak, the control device being capable, at least during part of the second mode, of making the second feedback loop diverge to lead the second microresonator to operate at a fourth resonance peak, possibly corresponding to the first resonance peak.

According to an embodiment, the optical device comprises at least a second output capable of supplying a second optical signal, the control device comprising a second sensor capable of supplying a second measurement signal representative of at least part of the power of the second optical signal, and the control device comprises a third unit capable, in the first mode, of determining a second error signal equal to the difference between a second reference signal and the second measurement signal and a fourth unit capable of determining a second signal for controlling the second heating element based on the second error signal.

According to an embodiment, the control device comprises a fifth unit capable of making the second feedback loop operate in the second mode when the switching from the first mode to the second mode is detected for the first microresonator.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

DETAILED DESCRIPTION

In the following description, only those elements which are necessary to the understanding of the present invention will be described and shown in the drawings. In particular, optoelectronic devices comprising ring-shaped optical microresonators are known by those skilled in the art and have not been described in detail.

In the following description, a signal which alter-nates between a first constant state, for example a low state, noted "0", and a second constant state, for example a high state, noted "1", is called "binary signal". The high and low states of binary signals of a same electronic circuit may be different. In particular, the binary signals may correspond to voltages or to currents which may not be perfectly constant in the high or low state.

Specific embodiments will be described for a multi-resonant optoelectronic device comprising at least one optical ring-shaped microresonator. However, such embodiments may be adapted to other multi-resonant optoelectronic devices, particularly an optoelectronic device comprising a disk-shaped optical microresonator, a Mach-Zehnder type interferometer, or a laser cavity.

Figure 4:
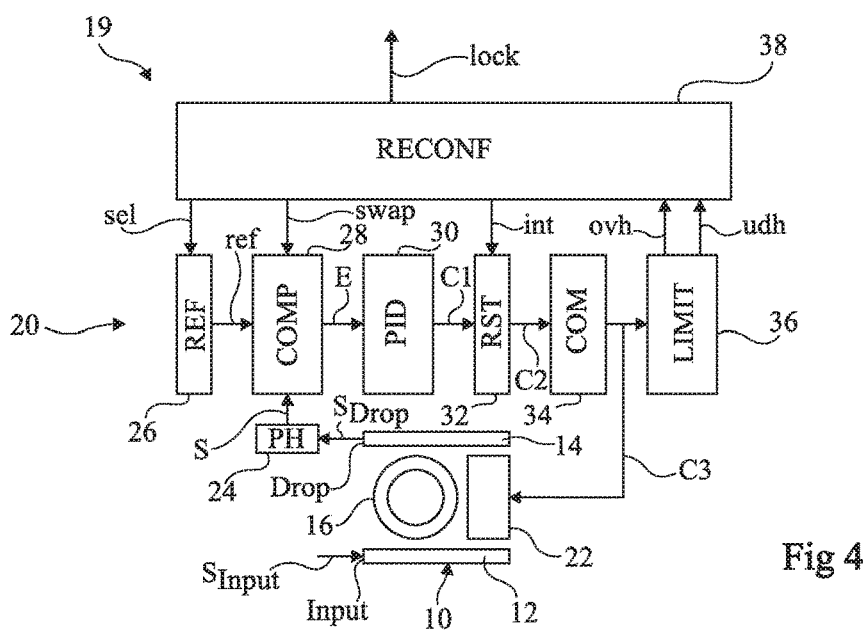
FIG. 4 shows, in the form of a block diagram, an embodiment of an optoelectronic device comprising a device for controlling a heating element of a ring-shaped optical microresonator.

FIG. 4 shows an embodiment of an optoelectronic device 19 comprising a ring-shaped optical microresonator 10 and an electronic device 20 for controlling a heating element 22 of microresonator 10. According to an embodiment, heating element 22 may comprise a resistor formed by a conductive track, for example, metallic, which takes the shape of ring 16. According to another embodiment, heating element 22 is confounded with waveguide 16. In this case, the material of waveguide 16 may be selected to have the adapted resistivity.

Device 20 comprises:

a sensor 24 (PH), capable of supplying an analog measurement signal S representative of power PDrop of light signal SDrop provided at end Drop of microresonator 10;

a unit 26 (REF) receiving a selection signal sel and providing an output ref;

a unit 28 (COMP) receiving measurement signal S and reference signal ref and further receiving a binary swapping signal swap and providing an analog error signal E which depends on swapping signal swap and on the difference between measurement signal S and reference signal ref;

a regulation unit 30 (PID), for example, of proportional-integral-derivative type, receiving error signal E and providing an analog control signal C1;

a modification unit 32 (RST) receiving control signal C1 and an interrupt signal int and providing an analog control signal C2;

a control unit 34 (COM) transforming control signal C2 into an analog control signal C3 adapted to heating element 22;

a unit 36 (LIMIT) receiving signal C3 and providing a binary overheating signal ovh and a binary undereating signal udh; and a supervision unit 38 (RECONF) receiving signals udh and ovh and providing signals ref, swap, int, and further providing a binary signal lock to another electronic system, not shown, for example, a data transmission system using microresonator 10 as a modulator.

Each unit 26, 28, 30, 32, 34, 36, 38 of device 20 may be entirely or partly formed by a dedicated circuit or by a processor executing a sequence of instructions stored in a memory.

Sensor 24 is capable of converting at least part of light signal SDrop into an analog electric signal S. Sensor 24 may comprise a photodiode or a photoresistor. Signal S may correspond to a voltage or to a current representative of power PDrop of optical signal SDrop.

According to an embodiment, unit 28 is capable of providing an analog error signal E equal to the difference between reference signal ref and measurement signal S when signal swap is in a first state, for example a low state noted "0", and equal to the difference between measurement signal S and reference signal ref when signal swap is at a second state, for example a high state noted "1".

FIG. 5 shows an embodiment of unit 28 comprising a first differential amplifier 40 having its non-inverting input (+) receiving reference signal ref, having its inverting input (−) receiving signal S, and providing a signal E1 which may be proportional to the difference between reference signal ref and signal S. Unit 28 comprises a second differential amplifier 42 having its non-inverting input (+) receiving signal S, having its inverting input (−) receiving reference signal ref, and providing a signal E2 which may be proportional to the difference between signal S and reference signal ref. According to an embodiment, signals E1 and E2 have the same amplitude in absolute value and have opposite signs. Unit 28 further comprises a multiplexer 44 controlled by signal swap, receiving signal E1 at a first input and signal E2 at a second input and providing signal E. As an example, signal E provided by multiplexer 44 is equal to signal E2 when signal swap is at "1" and is equal to E1 when signal swap is at "0".

FIG. 6 shows another embodiment of unit 28 comprising a swapping unit 46 (Swap) and a differential amplifier 48 which provides signal E. Swapping unit 46 is controlled by signal swap. It receives reference signal ref at a first end and signal S at a second end and provides a first output signal O1 to the non-inverting input (+) of differential amplifier 48 and a second output signal O2 to the inverting input (−) of differential amplifier 48. When signal swap is at "0", first output signal O1 is equal to reference signal ref and second output signal O2 is equal to signal S. When signal swap is at "1", first output signal O1 is equal to signal S and second output signal O2 is equal to reference signal ref.

FIG. 7 shows an embodiment of swapping unit 46 of FIG. 6. Unit 46 comprises a first multiplexer 50 controlled by signal swap and receiving reference signal ref at a first input and signal S at a second input and supplying signal O1. As an example, signal O1 supplied by multiplexer 50 corresponds to reference signal ref when signal swap is at "0", and is equal to signal S when signal swap is at "1". Unit 46 comprises a second multiplexer 52 controlled by signal swap and receiving signal S at a first input and reference signal ref at a second input and providing signal O2. As an example, signal O2 delivered by multiplexer 52 is equal to signal S when signal swap is at "0", and is equal to reference signal ref when signal swap is at "1".

FIG. 8 shows an embodiment of unit 32 of FIG. 4. Unit 32 comprises a multiplexer 54 controlled by signal int and receiving signal C1 at a first input and signal NULL at a second input and providing signal C2. As an example, signal C2 delivered by multiplexer 54 corresponds to signal C1 when signal int is at "0", and is equal to signal NULL when signal int is at "1". According to an embodiment, signal NULL is at a level such that it causes a lack of heating by heating element 22. Supervision unit 38 may set to "0" signal int when a temperature regulation of ring 16 is not desired to be performed, for example when microresonator 10 receives no optical signal SInput.

FIG. 9 shows an embodiment unit 34 and of heating element 22 of FIG. 4. According to an embodiment, heating element 22 is a resistor and the heating is due to the thermal power dissipated by the resistor by Joule effect. Unit 34 may correspond to a MOS transistor, for example, with an N channel, having its gate receiving signal C2, having its source connected to a source of a low reference potential GND, for example, the ground, and having its drain connected to a terminal of resistor. The other terminal of the resistor is connected to a source of a high reference potential VDD. According to an embodiment, the voltage between the drain of transistor 34 and ground GND corresponds to signal C3. In the present embodiment, signal C3 thus is a decreasing function of the thermal power dissipated by resistor 22.

According to another embodiment, unit 34 may be a MOS transistor having its source connected to high reference potential VDD and having its drain connected to a terminal of resistor 22. The other terminal of the resistor is connected to the source of reference potential GND. The voltage between the drain of transistor 34 and ground GND corresponds to signal C3, which is then an increasing function of the dissipated thermal power.

FIG. 10 shows an embodiment of unit 36 for detecting an overheating or undereating state in the case where signal C3 is an increasing function of the dissipated power. Unit 36 comprises a first comparator 56 receiving signal C3 at its non-inverting input (+) and a signal ovh_th at its inverting input (−) and delivering binary signal ovh. Unit 36 comprises a second comparator 58 receiving signal C3 at its inverting input (−) and a signal udh_th at its non-inverting input (+) and delivering binary signal udh.

Signal ovh_th is representative of a maximum heating threshold beyond which ring 16 is considered to be overheating. As an example, signal ovh is at state "1" when control signal C3 is higher than threshold ovh_th, which means that ring 16 is overheating and signal ovh is at state "0" when control signal C3 is lower than threshold ovh_th, which means that ring 16 is not overheating. Signal udh_th is representative of a minimum heating threshold below which ring 16 is considered to be under heated. As an example, signal udh is at state "0" when control signal C3 is higher than threshold udh_th, which means that ring 16 is sufficiently heated and signal udh is at state "1" when control signal C3 is lower than threshold udh_th, which means that the ring is under heated.

According to an embodiment, unit 26 is capable of delivering reference signal ref at a level from among a plurality of levels according to signal sel. As an example, unit 26 may comprise a plurality of MOS transistors assembled in parallel, the transistor assembly being series-connected with a resistor. Signal sel may control the turning-on or the turning-off of the transistors and reference signal ref may be the voltage across the resistor or the current flowing through the resistor. The levels of reference signal ref are then obtained by the selective turning-on of the transistors.

Unit 30 is preferably an analog PID regulator. Preferably, unit 30 mainly has an integral action. According to an embodiment, the gain of the proportional portion of the PID regulator is adapted so that control signal C3 does not cause too significant oscillations of measurement signal S with respect to reference signal ref.

According to an embodiment, the regulation of the temperature of ring 16 is performed by heating element 22. For a regulation to be performed, it is desirable for heating element 22 to always be heating ring 16, that is, for control signal C3 to remain above threshold $udh_{13}th$. However it is not desirable for the thermal power dissipated by heating element 22 to be too high, particularly for reasons of electric consumption and to avoid deteriorating microresonator 10. It is thus desirable for heating element 22 not to heat ring 16 too much, that is, for control signal C3 to remain below threshold ovh_th. As an example, threshold ovh_th corresponds to a ring temperature Tring greater than the ambient temperature by approximately 25° C. and threshold udh_th corresponds to a ring temperature Tring greater than the ambient temperature by approximately 2° C.

According to an embodiment, the control of heating element 22 by control device 20 is performed from analog measurement signal S provided by sensor 24 and which is representative of power PDrop of light signal SDrop provided at end Drop of microresonator 10. Signal S is not a signal representative of the temperature of microresonator 10. The control of heating element 22 is thus not performed from a signal representative of the temperature of microresonator 10. Advantageously, device 20 comprises no temperature sensor. Control device 20 performs a regulation of control signal C3 of heating element 22 but does not directly regulate the temperature of microresonator 10. Indeed, at no time does control device 20 implement a signal representative of the temperature of microresonator 10.

Optoelectronic device 19 may further comprise a device for measuring the optical power of signal SInput supplied to waveguide 12 and which is used as a reference optical power. According to an embodiment, waveguide 12 may comprise, upstream of ring 16, an optical beam divider which enables to extract a known fraction of the incident optical signal. The optical power of this fraction of the incident optical signal can be measured. Based on the known ratio of the optical power of the extracted fraction to the optical power of the incident optical signal, the optical power of signal SInput can be determined. According to another embodiment, the optical power of incident signal SInput may be previously known.

Control device 20 may operate according to first and second operating modes. In the first operating mode, also called shiftless regulation mode, for example, as long as control signal C3 is between thresholds udh_th and ovh_th, heating element 22 is controlled by a feedback loop where heating element 22 is controlled so that measurement signal S follows reference signal ref, that is, so that the power of optical signal SDrop remains substantially constant at a determined level. When control signal C3 rises above threshold ovh_th or decreases below threshold udh_th, control device 20 switches to the second operating mode, also called shift regulation mode, where heating element 22 is controlled to shift the transfer function of microresonator 10 towards red or towards blue all the way to a new operating point where the power of optical signal SDrop is at the determined level again and where control signal C3 is for example between thresholds udh_th and ovh_th again, to switch back to the first operating mode.

Figure 11:
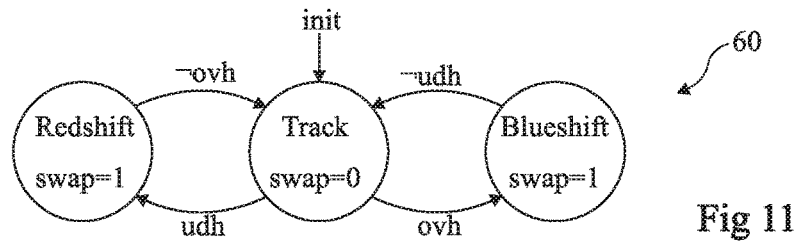
FIG. 11 shows an embodiment of a finite state machine modeling the operation of a unit of the control device shown in FIG. 4.

FIG. 11 shows a finite state machine 60 modeling the operation of an embodiment of supervision unit 38 of control device 20 shown in FIG. 4. In this embodiment, supervision unit 38 may operate in three states called "Track", "Redshift", and "Blueshift". The operation of supervision unit 38 starts at state "Track". In this state, supervision unit 38 delivers signal swap at state "0". In states "Redshift" and "Blueshift", supervision unit 38 sets signal swap to "1". Supervision unit 38 switches from state "Track" to state "Redshift" when signal udh switches to "1" and switches from state "Redshift" to state "Track" when signal ovh switches to "0". Supervision unit 38 switches from state "Track" to state "Blueshift" when signal ovh switches to "1" and switches from state "Blueshift" to state "Track" when signal udh switches to "0". In the shiftless regulation mode, finite state machine 60 is at state "Track". In the shift regulation mode, finite state machine 60 may be at states "Redshift", "Blueshift", or "Track".

Figure 12:
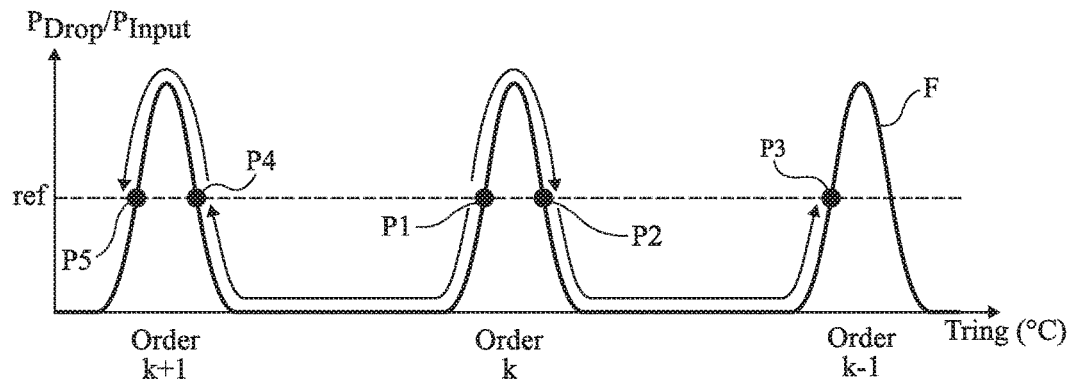
FIG. 12 illustrates the variation of the power of the light signal supplied by the microresonator according to the temperature of the microresonator ring when the control device of FIG. 4 operates according to the finite state machine of FIG. 11.

FIG. 12 illustrates an example of variation of ratio PDrop/PInput of the power of optical signal SDrop to the power of optical signal SInput according to temperature Tring of ring 16 of microresonator 10 when control device 20 operates according to finite state machine 60 of FIG. 11. FIG. 12 shows transfer function F of microresonator 10. According to the present embodiment, reference signal ref is substantially constant.

Microresonator 10 receives at input a monochromatic optical signal SInput, for example, provided by a laser. Control device 20 is assumed to be at operating point P1 and supervision unit 38 is assumed to be at state "Track". Signals udh, ovh, and swap are at "0". The regulation of the control of heating element 22 is then adapted to maintain the device at operating point P1 during variations of temperature Tring of ring 16 as long as control signal C3 remains between signals udh_th and ovh_th. Point P1 is a stable point of equilibrium for the regulation performed at state "Track". According to an embodiment, operating point P1 is located on the resonance peak of order k of microresonator 10. According to an embodiment, operating point P1 is located at mid-height, for example, on the rising side of the resonance peak of order k of microresonator 10. The accuracy of the regulation of the operating point depends on quality factor Q of the resonance peaks of microresonator 10. As an example, the regulation accuracy on the wavelength is in the order of 10Q.

When ambient temperature Tamb in the vicinity of ring 16 strongly increases, control signal C3 may decrease below threshold udh_th to maintain temperature Tring at a value allowing the proper operation of the microresonator. The heating of ring 16 is then below the minimum heating. Unit 36 then sets signal udh to "1". Supervision unit 38 then switches to state "Redshift" and sets signal swap to "1". The regulation implemented by units 28, 30, 32, and 34 is carried out by inverting signal S and reference signal ref. Since signal S is then higher than reference signal ref, heating element 22 is controlled to increase the provided thermal power. Ring 16 is thus heated, which causes a redshift of the transfer function of microresonator 10. The operating point then shifts to point P2 for which measurement signal S is equal to reference signal ref and which corresponds to a stable point of equilibrium for the regulation performed at state "Redshift". At operating point P2, control signal C3 being below threshold ovh_th, signal ovh is at "0". Supervision unit 38 then switches to state "Track" and sets signal swap to "0". The regulation is then performed with no swapping of reference signal ref and of measurement signal S. Point P2 is an unstable point of equilibrium for the regulation performed at state "Track" so that heating element 22 is controlled again to heat ring 16. The operating point then shifts all the way to point P3 for which measurement signal S is equal to reference signal ref and which is a stable operating point for the regulation performed at state "Track". According to an embodiment, the regulation performed by regulation unit 30 imposes a residual error of control C3, which enables to ensure that the operating point effectively displaces from point P2 to point P3. The duration of the switching from points P2 to P3 is shorter than one cycle of the clock which rates supervision unit 38. The operating point has thus displaced from P1 to P3, which is at the resonance of order k−1.

When ambient temperature Tamb in the vicinity of ring 16 strongly decreases, control signal C3 may increase above threshold ovh_th to maintain temperature Tring at a value allowing the proper operation of the microresonator. The heating of ring 16 is then higher than the maximum heating. Unit 36 sets signal ovh to "1". Supervision unit 38 then switches to state "Blueshift" and sets signal swap to "1". The regulation implemented by units 28, 30, 32, and 34 is carried out by inverting signal S and reference signal ref. Since signal S is lower than reference signal ref, heating element 22 is then controlled to decrease, or even stop, the provided thermal power. Ring 16 is thus less heated or is no longer heated, which causes a blueshift of the transfer function of microresonator 10. The operating point then shifts to point P4 for which measurement signal S is equal to reference signal ref and which corresponds to a stable point of equilibrium for the regulation performed at state "Blueshift". At operating point P4, control signal C3 being above threshold udh_th, signal udh is at "0". Supervision unit 38 then switches to state "Track" and sets signal swap to "0". The regulation is then performed with no swapping of reference signal ref and of measurement signal S. Point P4 is an unstable point of equilibrium for the regulation performed at state "Track" so that heating element 22 is controlled again not to heat ring 16. The operating point then shifts to point P5 for which measurement signal S is equal to reference signal ref and which is a stable operating point for the regulation performed at state "Track". According to an embodiment, the regulation performed by regulation unit 30 imposes a residual error of control C3 which enables to ensure that the operating point effectively displaces from point P4 to point P5. The duration of the switching from points P4 to P5 is shorter than one cycle of the clock which rates supervision unit 38. The operating point has thus displaced from P1 to P5, which is at the resonance of order k+1.

In the previously-described embodiment, the duration of a cycle of the clock which rates supervision unit 38 is longer than the switching time between two operating points in the shiftless regulation mode and in the shift regulation mode. In the case where the duration of a cycle of the clock which rates supervision unit 38 may be shorter than the time of switching between two operating points in the shiftless regulation mode and in the shift regulation mode, finite state machine 60 modeling the operation of supervision unit 38 of control device 20 may be modified, in particular to provide the detection of the switching of signal udh to "0" to come out of state "Redshift" and the detection of the switching of signal ovh to "0" to come out of state "Blueshift".

In the shiftless regulation mode, the provision of control signal C3 is performed by control device 20 by a feed-back loop which comprises at least point P1 as a stable point of equilibrium. During the shift regulation mode, the feedback loop implemented by control device 20 for the provision of control signal C3 is modified so that point P1 becomes an unstable point of equilibrium. According to an embodiment, this is performed by inverting signal S and reference signal ref. The feedback loop implemented by control device 20 is thus permanently closed when the regulation of the control of heating element 22 is performed. Expression "making a feedback loop diverge" means modifying the closed feedback loop so that at least one stable point of equilibrium towards which the feedback loop converges becomes an unstable point of equilibrium from which the closed feedback loop diverges. According to an embodiment, in the shift feedback loop, all the stable points of equilibrium implemented by control device 20 are transformed into unstable points of equilibrium.

The transfer function of microresonator 10 comprises resonance peaks, each resonance peak comprising a rising edge and a falling edge. According to an embodiment, in the shiftless regulation method, all the stable points of equilibrium of the regulation implemented by control device 20 are located on the same side of the resonance peaks of the transfer function of microresonator 10, that is, all the stable points of equilibrium are located on rising edges of resonance peaks or all the stable points of equilibrium are located on the falling edges of resonance peaks. In the shift regulation mode, the stable points of equilibrium of the regulation implemented by control device 20 are located on the opposite sides of the resonance peaks with respect to the shift regulation mode. This means that, for example, when the stable points of equilibrium are located on rising edges of resonance peaks in the shiftless regulation mode, they are located on falling edges of resonance peaks in the shift regulation mode. In FIG. 12 the stable points of equilibrium are shown, as an example, substantially at mid-height of the resonance peaks. However, the accurate positions of the stable points of equilibrium of the transfer function of microresonator 10 are in particular selected according to criteria of stability of the regulation performed by control device 20. According to an embodiment, during the regulation of control signal C3 by control device 20, operating point P1 of the microresonator may be closer to the base than to the top of the resonance peak.

Advantageously, the regulation implemented by control device 20 is fast. Further, it comprises no initial calibration step.

Figure 13:
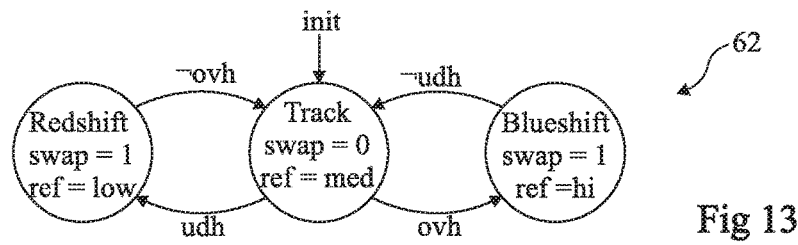
FIG. 13 shows another embodiment of a finite state machine modeling the operation of a unit of the control device shown in FIG. 4.

FIG. 13 shows a finite state machine 62 modeling the operation of another embodiment of supervision unit 38 of control device 20 shown in FIG. 4. State machine 62 is identical to state machine 60, but for the fact that reference signal ref may take three values according to selection signal sel: a high value hi, a medium value med, and a low value low. Medium value med corresponds to the desired operating point. At state "Track", supervision unit 38 supplies a signal sel to unit 26 so that reference signal ref is at level med. At state "Redshift", supervision unit 38 provides a signal sel to unit 26 so that reference signal ref is at level low. At state "Blueshift", supervision unit 38 provides a signal sel so that reference signal ref is at level hi.

Figure 14:
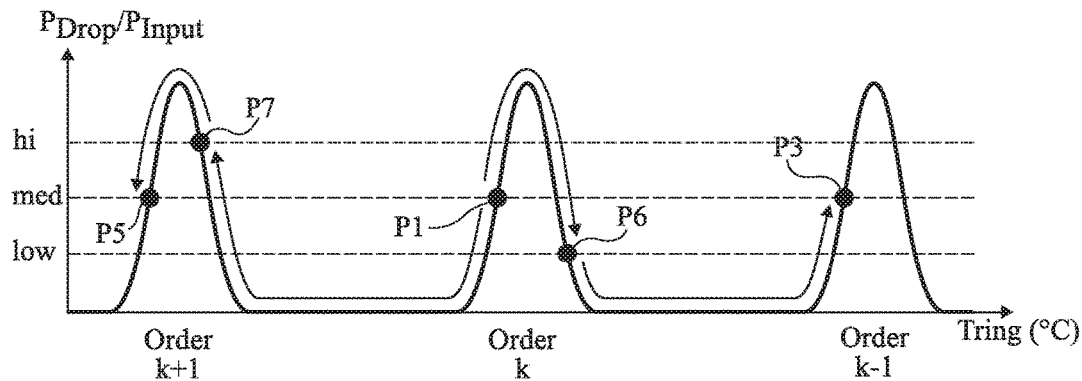
FIG. 14 illustrates the variation of the power of the light signal supplied by the microresonator according to the temperature of the microresonator ring when the control device of FIG. 4 operates according to the finite state machine of FIG. 13.

FIG. 14 is a drawing similar to FIG. 12 when control device 20 operates according to finite state machine 62 of FIG. 13.

The operation of control device 20 is identical to what has been previously described in relation with FIG. 12 with the following differences:

when supervision unit 38 switches from state "Track" to state "Redshift", reference signal ref is set to level low, so that the initial difference between signal S and reference signal ref is increased, which avoids setting to an unstable point of equilibrium of state "Track" and accelerates the redshift of the transfer function of microresonator 10;

operating point P2 is replaced with an operating point P6 for which reference signal ref is at level low so that, at point P6, when supervision unit 38 switches from state "Redshift" to state "Track" and sets reference signal ref to level med, the initial difference between signal S and reference signal ref favors the carrying on of the redshift towards operating point P3;

when supervision unit 38 switches from state "Track" to state "Blueshift", reference signal ref is set to level hi, so that the initial difference between signal S and reference signal ref is increased, which avoids setting to an unstable point of equilibrium of state "Track" and accelerates the blueshift of the transfer function of microresonator 10;

operating point P4 is replaced with an operating point P7 for which reference signal ref is at level hi so that, at point P7, when supervision unit 38 switches from state "Blueshift" to state "Track" and sets reference signal ref to level med, the initial difference between signal S and reference signal ref favors the carrying on of the blueshift towards operating point P5.

Figure 15:
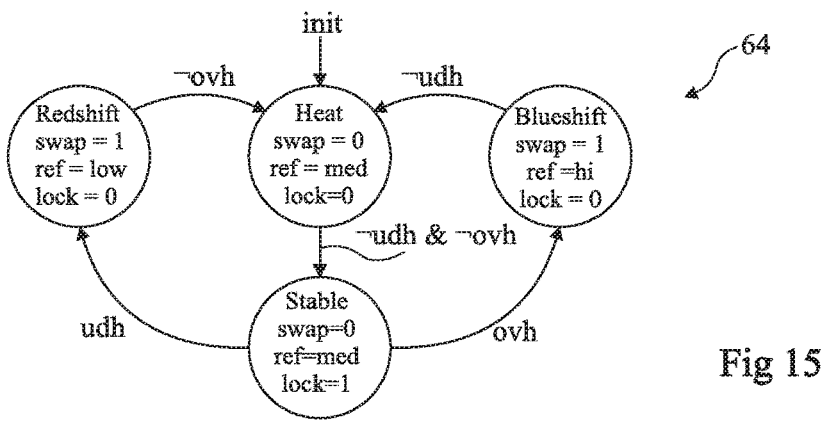
FIGS. 15 and 16 show other embodiments of finite state machines modeling the operation of a unit of the control device shown in FIG. 4.

FIG. 15 shows a finite state machine 64 modeling the operation of another embodiment of supervision unit 38 of control device 20 adapted to the case where supervision unit 38 further provides a signal lock which is at "1" in the shiftless operating mode, that is, in the present embodiment, when control signal C3 is between thresholds udh_th and ovh_th, and which is at "0" in the shift regulation mode, that is, in the present embodiment, when control signal C3 is no longer between udh_th and ovh_th.

State machine 64 is identical to state machine 62 with the difference that state "Track" is replaced with two states "Heat" and "Stable" in each of which signal swap is at "0" and reference signal ref is at level med. Signal lock is at "0" in state "Heat" and at "1" in state "Stable". Further, in states "Redshift" and "Blueshift", signal lock is at "0". Supervision unit 38 switches from state "Stable" to state "Redshift" when signal udh switches to "1" and switches from state "Stable" to state "Blueshift" when signal ovh switches to "1". Supervision unit 38 switches from state "Redshift" to state "Heat" when signal ovh switches to "0" and switches from state "Blueshift" to state "Heat" when signal udh switches to "0". Supervision unit 38 switches from state "Heat" to state "Stable" when signals udh and ovh are at zero.

The first operating mode then corresponds to state "Stable" while the second operating mode corresponds to states "Redshift", "Blueshift", and "Heat".

The operation of state machine 64 is identical to what has been previously described in relation with FIG. 14 but for the fact that at operating points P1, P3, and P5, supervision unit 38 is at state "Stable" and that, between operating points P6 and P3 and between operating points P7 and P5, supervision unit 38 is at state "Heat".

Figure 16:
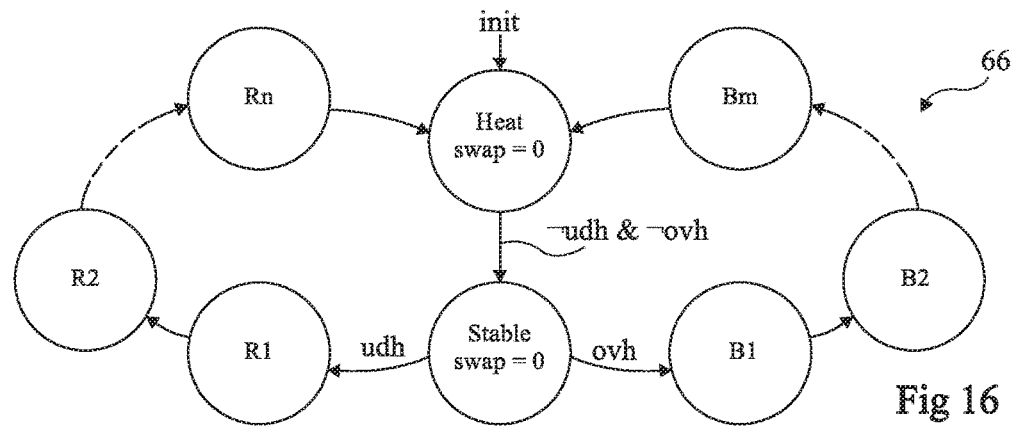

FIG. 16 shows the general structure of a finite state machine 66 modeling the operation of another embodiment of supervision unit 38 of control device 20. In this embodiment, state "Redshift" is replaced with n successive states R1 to Rn, where n is an integer greater than or equal to 1. The switching from state "Stable" to state "R1" is performed when signal udh is at "1". For at least one of states R1 to Rn, the received signal swap is at "1". Further, state "Blueshift" is replaced with m successive states B1 to Bm, where m is an integer greater than or equal to 1. For at least one of states B1 to Bm, signal swap is at "1". The switching from state "Stable" to state "B1" is performed when signal ovh is at "1".

Figure 17:
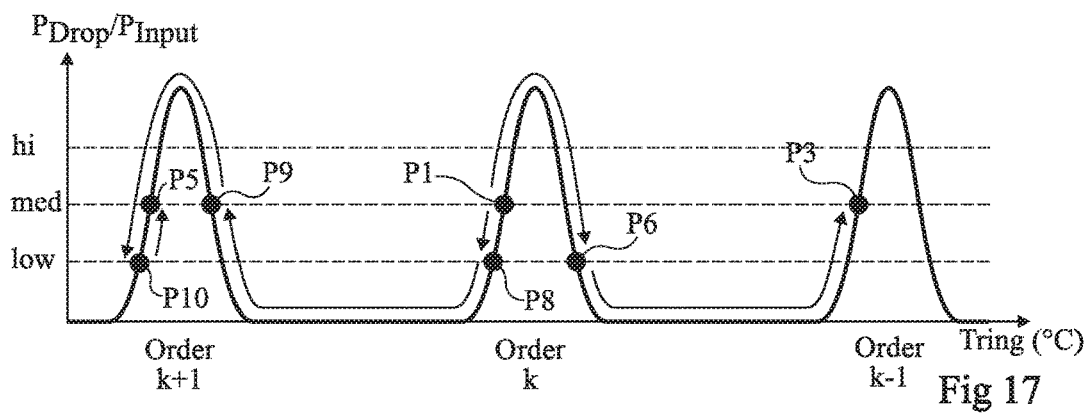
FIG. 17 illustrates the variation of the power of the light signal supplied by the microresonator according to the temperature of the microresonator ring when the control device of FIG. 4 operates according to a specific case of the finite state machine of FIG. 16.

FIG. 17 is a drawing similar to FIG. 14 when control device 20 operates according to an embodiment of finite state machine 66 of FIG. 16, with n equal to 1 and m equal to 3. In this embodiment, state R1 corresponds to previously-described state "Redshift". For state B1, reference signal ref is set to low and signal swap is at "0". For state B2, reference signal ref is set to med and signal swap is at "1". For state B3, reference signal ref is set to low and signal swap is at "0". The operating point switches from P1 to P8 at state B1, from P8 to P9 at state B2, from P9 to P10 at state B3, and from P10 to P5 at state "Heat".

This embodiment enables to only use levels "med" and "low" for reference signal ref during the regulation of heating element 22. It may be advantageous not to use level "hi" for reference signal ref since the quality factor of the transfer function of microresonator 10 is generally high, that is, the resonance peaks of the transfer function of microresonator 10 are generally narrow. The use of a level "hi" for reference signal ref may cause high variation rates of signal C3 for controlling heating element 22, which may not be desirable.

According to an embodiment, in the case where microresonator 10 is used as a modulator by a data transmission system, it is possible to only implement the regulation of signal C3 for controlling heating element 22 in the absence of a data transmission. When data are transmitted, the regulation implemented by control device 20 may be temporarily interrupted. According to an embodiment, this may be performed by making the gate of MOS transistor 34 shown in FIG. 9 floating, for example, by setting the output of multiplexer 54 shown in FIG. 8 at high impedance. The capacitance of the MOS transistor may be sufficient to maintain signal C2 substantially constant for the time of the transmission. According to another embodiment, an additional capacitor may be added to maintain signal C2 substantially constant for the time of the transmission.

The operating point to which microresonator 10 is taken during the data transmission may be different from the operating point to which microresonator 10 is taken in the absence of a data transmission and may, in particular, depend on the fact that data are transmitted or received. As an example, during a data receive phase, the operating point of the microresonator may be taken closer to the top of the resonance peak to decrease insertion losses towards port Pdrop which receives modulated signal S. During a data transmission phase, the operating point of the microresonator may be taken closer to the base of the resonance peak (that is, drawn away from the top), to increase the dynamic range of the transmitted signal. During the data transmission, the accurate position of the operating point may be modified by another mechanism, for example, by the application of a voltage across an electric junction at the level of microresonator 10.

Figure 18:
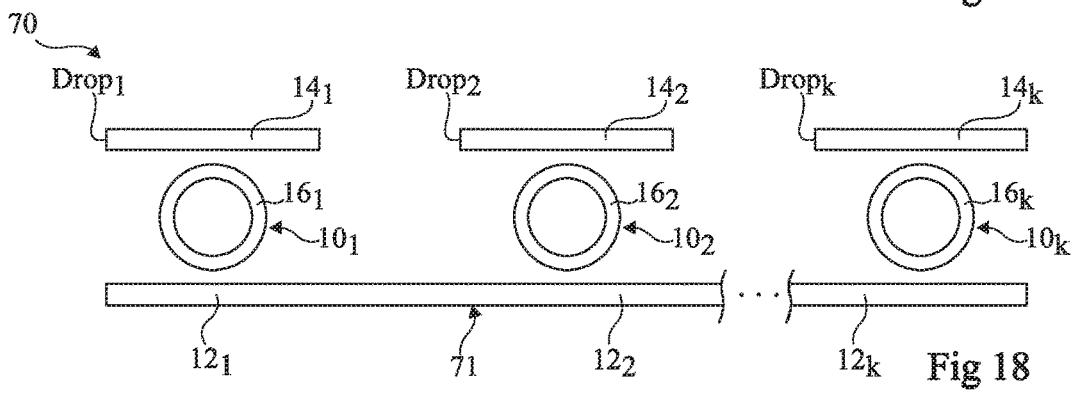
FIG. 18 shows another example of an optical device comprising ring-shaped optical microresonators.

FIG. 18 shows an example of an optical device 70 comprising a plurality of ring-shaped microresonators 101 to 10K, where K is an integer greater than or equal to 2. In the following description, the elements of each microresonator 10$i$, i being an integer varying from 1 to K, identical to those of microresonator 10 shown in FIG. 1, are designated with the same reference numerals followed by index "i". In the present example, waveguides 12$i$ are series-connected and form a single waveguide 71.

Optical device 70 may be used to implement a method of data transfer with a wave division mutiplexing (WDM) where a plurality of optical signals of different wavelengths, particularly up to K optical signals, may be simultaneously transmitted on waveguide 71 and where the transfer functions of ring-shaped microresonators 10$i$ are shifted from one another.

Figure 19:
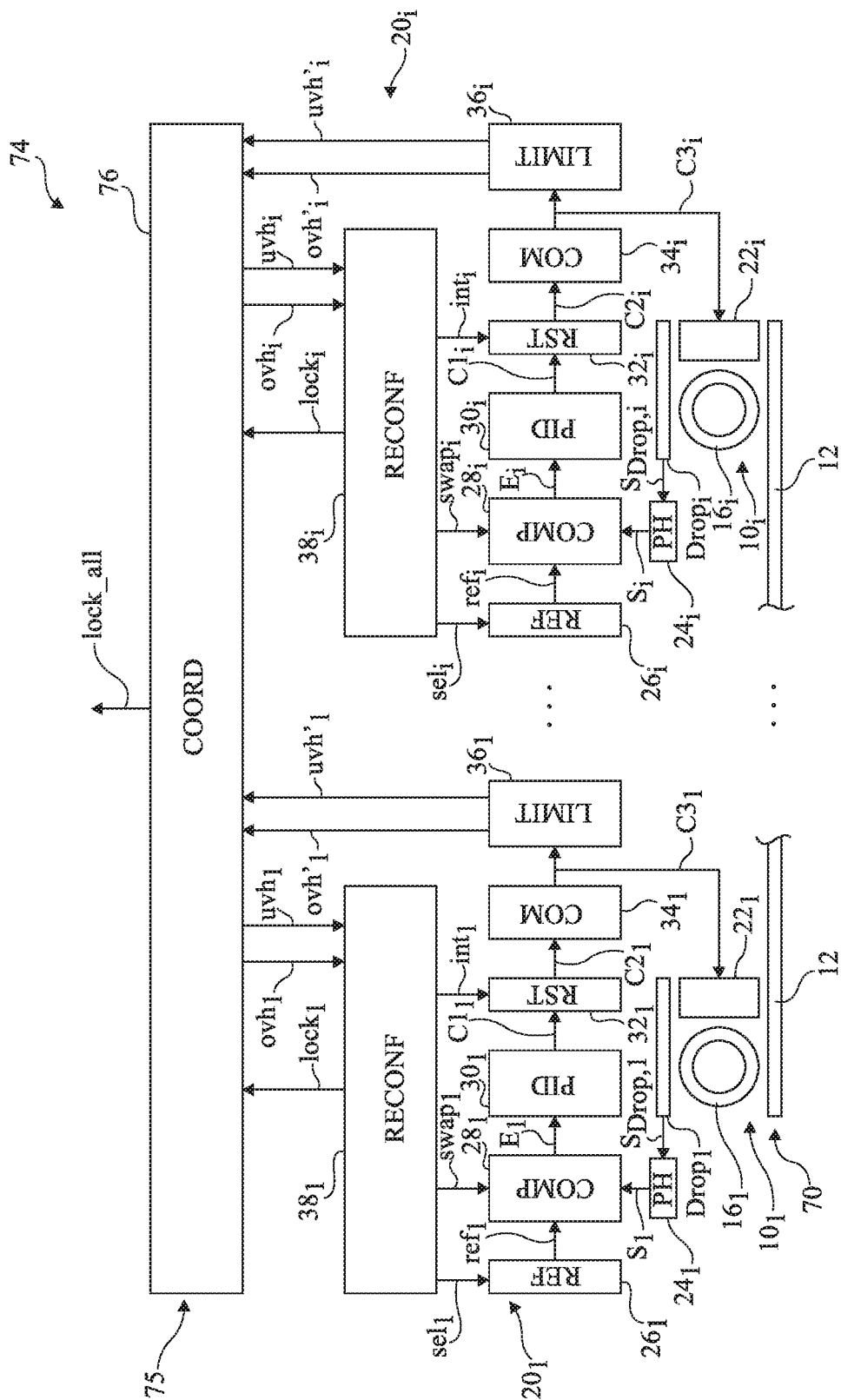
FIG. 19 shows, in the form of a block diagram, an embodiment of an optoelectronic device comprising a device for controlling heating elements of the optical device of FIG. 18.

FIG. 19 shows, in the form of a block diagram, an embodiment of an optoelectronic device 74 comprising optical device 70 of FIG. 18 and comprising a device 75 for control-ling heating elements of optical device 70.

Control device 75 comprises, for each ring-shaped microresonator 10$i$, with i varying from 1 to K, a control device 20$i$ which is substantially identical to the control device 20 shown in FIG. 4, the elements of each control device 20*i* identical to those of control device 20 shown in FIG. 4 being designated with the same reference numerals followed by index "i". Control device 75 further comprises a coordination unit 76 (COORD) which receives signals locki and supplies a signal lock all, particularly to another electronic system, for example, a data transmission using microresonators 10*i* as modulators.

Unlike control device 20 shown in FIG. 4 where signals ovh and udh are supplied by unit 36 directly to supervision unit 38, signals ovhi and udhi are supplied by coordination unit 76 to each supervision unit 38*i* and the signals supplied by each unit 36*i* are called ovh'i and udh'i. Signal ovh'i may be determined by each unit 36*i* as previously described for signal ovh, and signal udh'i may be determined by each unit 36*i* as previously described for signal ovh. Each supervision unit 38*i* may operate according to one of previously-described finite state machines 62, 64, 66.

According to an embodiment, the wavelength shift between the resonance peaks of two adjacent transfer functions of microresonators 10*i* is substantially equal to FSR/K. Further, optical signals SInput, j may be provided at the input of the waveguide, where j varies from 1 to L, L being an integer smaller than or equal to K. Each signal SInput, j is a monochromatic signal of wavelength λj, the interval between wavelengths λj and λj+1 being substantially equal to FSR/K. Each microresonator 10*i* is capable of capturing one of optical signals SInput,j.

During a shift operation, the transfer function of at least one microresonator 10*i* is shifted in wavelength by FSR/K so that microresonator 10*i* captures another optical signal. Preferably, during a shift operation, all the transfer functions of microresonators 10*i* are shifted by FSR/K so that, after the shift operation, each microresonator 10*i* captures another optical signal SInput,j. This advantageously enables, during a shift operation, to decrease the amplitude of the shift of the transfer function of each microresonator 10*i*.

Figure 20:
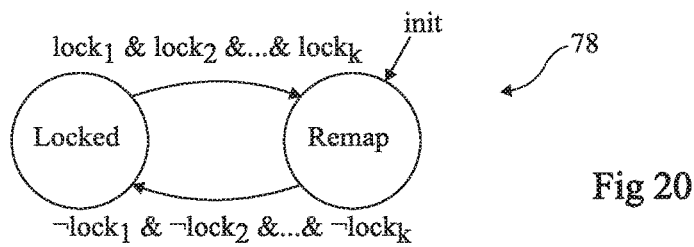
FIG. 20 shows an embodiment of a finite state machine modeling the operation of a unit of the control device shown in FIG. 19.

FIG. 20 shows a finite state machine 78 modeling the operation of an embodiment of coordination unit 76 of control device 75 shown in FIG. 19. State machine 78 comprises a state "Remap" and a state "Locked". Unit 76 switches from state "Remap" to state "Locked" when all signals locki, with i varying from 1 to K, are at "1". Unit 76 switches from state "Locked" to state "Remap" when at least one of signals locki, with i varying from 1 to K, is at "0".

At state "Locked", all supervision units 38*i* are at state "Stable". This means that the temperature regulation of ring 16*i* of each microresonator 10*i* is performed according to the first operating mode independently from the other microresonators 10*i*. The switching to state "Remap" means that one of units 36*w*, w being an integer from 1 to K, has provided supervision unit 78 with signal ovh'w at state "1" or signal udh'w at state "1". According to an embodiment, supervision unit 76 then controls the blueshift or the redshift of all the transfer functions of microresonators 10*i*, with i varying from 1 to K. As an example, if the switching to state "Remap" is triggered by the setting to "1" of signal ovh'w, supervision unit 78 sets all signals ovhi to "1" and if the switching to state "Remap" is triggered by the setting to "1" of signal udh'w, supervision unit 78 sets all signals udhi to "1". Thereby, the shifts of the transfer functions of all microresonators 38*i* are all performed in the same direction, towards blue or towards red.

FIGS. 21 to 24 illustrate the operation of control device 75 shown in FIG. 19 in the case where optical device 70 comprises two ring-shaped microresonators 101 and 102.

Figure 21:
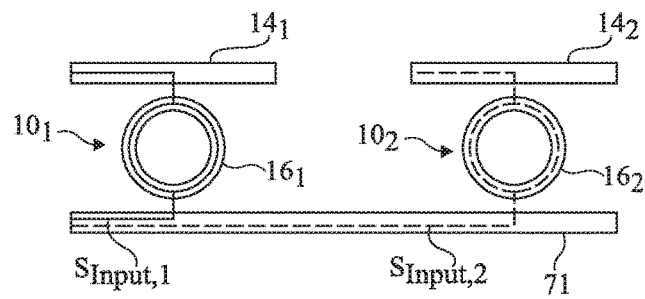
FIGS. 21 and 22 schematically show the paths of optical rays in an optoelectronic device shown in FIG. 19 with two ring-shaped microresonators at two steps of an operating mode of the control device of FIG. 19.

FIG. 21 schematically shows the paths of two optical rays in optical device 70 before a shift operation. Waveguide 71 receives a first optical monochromatic signal SInput,1 schematically shown by a continuous line and a second monochromatic optical signal SInput,2 schematically shown by a dashed line. Before the shift operation, the transfer functions of ring-shaped microresonators 101 and 102 are adapted so that first optical signal SInput,1 is substantially entirely captured, for example, at more than 99%, by first microresonator 101 and that second optical signal SInput,2 is substantially entirely captured, for example, at more than 99%, by second microresonator 102.

Figure 22:
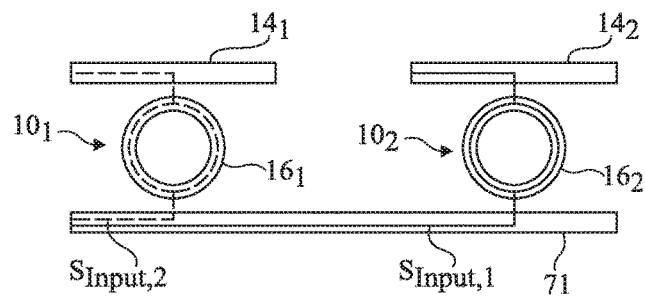

FIG. 22 schematically shows the paths of optical rays in optical device 70 after a shift operation. The transfer functions of ring-shaped microresonators 101 and 102 have been shifted so that first optical signal SInput,1 is substantially entirely captured, for example, at more than 99%, by second microresonator 102 and that second optical signal SInput,2 is substantially entirely captured, for example, at more than 99%, by first microresonator 101.

Figure 23:
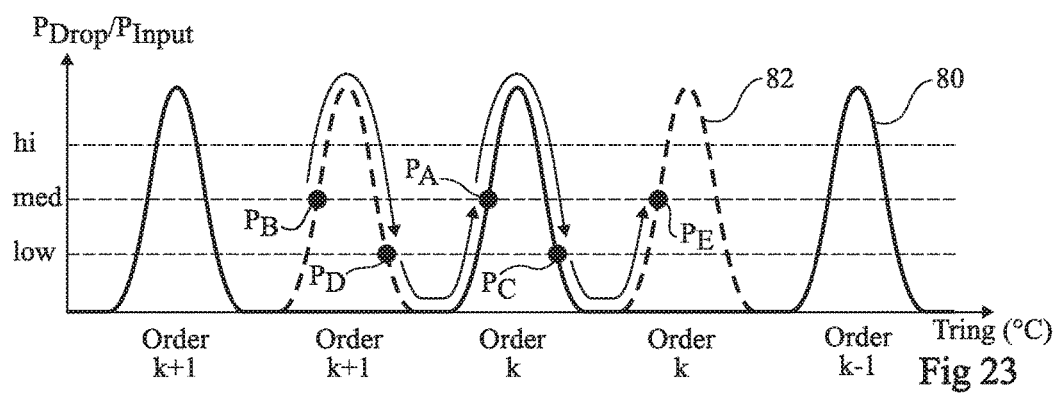
FIGS. 23 and 24 illustrate the power variation of the light signals provided by the microresonators according to the temperature of the rings of the microresonators for an operating mode of the control device of FIG. 19.
Figure 24:
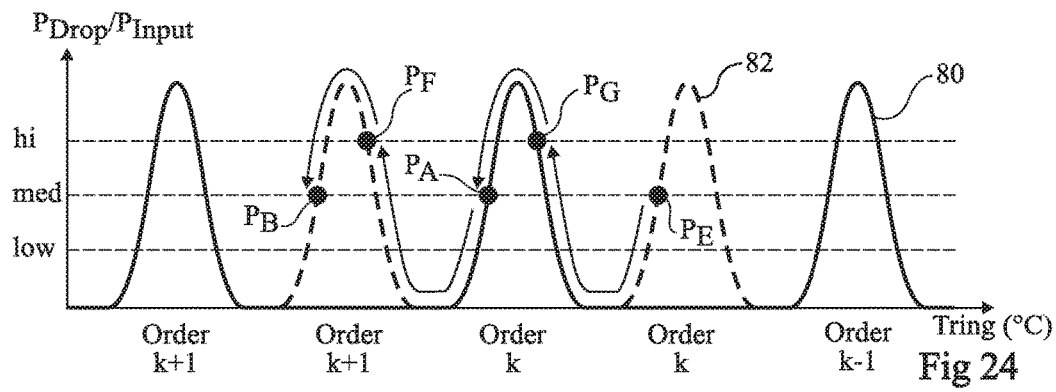

FIGS. 23 and 24 show the variation of the operating point of the control device 75 associated with first optical signal SInput,1 or with second optical signal SInput,2 according to temperature during a respective redshift and blueshift operation. FIGS. 23 and 24 show the transfer function of ring-shaped microresonator 101 by a continuous line 80 and the transfer function of ring-shaped microresonator 102 by a dashed line 82. As an example, each supervision unit 381 and 382 operates according to the finite state machine previously described in relation with FIG. 15.

In the case of a redshift, as shown in FIG. 23, it is considered that, initially, control device 75 is at operating point PA at the resonance of order k for microresonator 101 and at operating point PB at the resonance of order k+1 for microresonator 102. The operating point associated with optical signal SInput,1 varies from point PA to point PC and the operating point associated with optical signal SInput,2 varies from point PB to point PD as previously described in relation with FIG. 14 for the transition from point P1 to point P6. Signal SInput,1 is then captured by microresonator 102 so that the operating point associated with optical signal SInput,1 varies all the way to point PE associated with the resonance of order k of microresonator 102 and signal SInput,2 is then captured by microresonator 101 so that the operating point associated with optical signal SInput,2 varies all the way to point PA associated with the resonance of order k of microresonator 101.

In the case of a blueshift, as shown in FIG. 24, it is considered that, initially, control device 75 is at operating point PA at the resonance of order k for microresonator 101 and at operating point PE at the resonance of order k for microresonator 102. The operating point associated with optical signal SInput,1 varies from point PA to point PF and the operating point associated with optical signal SInput,2 varies from point PE to point PG, as previously described in relation with FIG. 14 for the transition from point P1 to point P7. Signal SInput,1 is then captured by microresonator 102 so that the operating point associated with optical signal SInput,1 varies all the way to point PB associated with the resonance of order k+1 of microresonator 102 and signal SInput,2 is then captured by microresonator 101 so that the operating point associated with optical signal SInput,2 varies all the way to point PA associated with the resonance of order k of microresonator 101.

In the case where a plurality of microresonators are successively arranged on the same waveguide, the position of the operating point of each microresonator may be determined to take into account the presence of the other microresonators to ascertain that the optical power which reaches each microresonator is sufficient.

Figure 25:
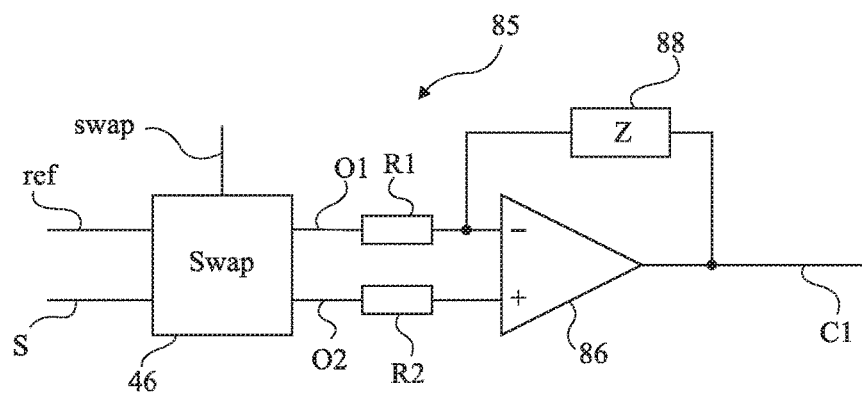
FIGS. 25 and 26 are electric diagrams of other embodiments of units of the control device of FIG. 4.

FIG. 25 shows an embodiment where the functions provided by previously-described units 28 and 30 are provided by a single unit 85. According to an embodiment, unit 85 comprises swapping unit 46 previously described in relation with FIG. 6. Unit 85 further comprises an operational amplifier 86 having its inverting input (−) connected to the output of swapping unit 46 supplying signal O1 via a resistor R1 and having its non-inverting input (+) connected to the output of swapping unit 46 supplying signal O2 via a resistor R2. The output of operational amplifier 86 is connected to the inverting input (−) by a block 88 providing a transfer function Z. Transfer function Z is selected according to the desired regulation type.

In the previously-described embodiments, the feedback loop implemented by control device 20 is made diverging by inverting measurement signal S and reference signal ref. According to another embodiment, the feedback loop implemented by control device 20 is made diverging by temporarily modifying the transfer function provided by the regulation loop.

Figure 26:
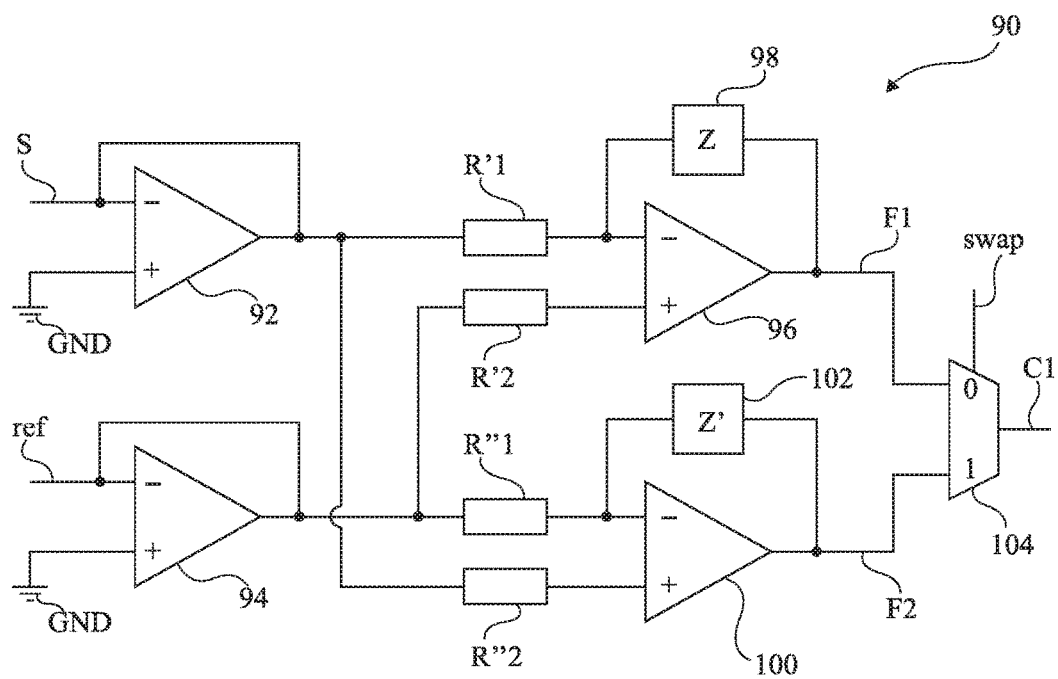

FIG. 26 shows an embodiment where the functions provided by previously-described units 28 and 30 are provided by a single unit 90. Unit 90 comprises a follower-assembled operational amplifier 92, having its inverting input (−) receiving signal S, having its non-inverting input (+) connected to a source of a low reference potential GND, for example, the ground, and having its output connected to the non-inverting input. Unit 90 comprises a follower-assembled operational amplifier 94, having its inverting input (−) receiving reference signal ref, having its non-inverting input (+) connected to the source of a low reference potential GND, and having its output connected to the non-inverting input. Unit 90 further comprises an operational amplifier 96 having its inverting input (−) connected to the output of operational amplifier 92 via a resistor R'1 and having its non-inverting input (+) connected to the output of operational amplifier 94 via a resistor R'2. Operational amplifier 96 provides signal F1. The output of operational amplifier 96 is connected to the inverting input (−) by a block 98 providing a transfer function Z. Transfer function Z is selected according to the desired regulation type. Unit 90 further comprises an operational amplifier 100 having its inverting input (−) connected to the output of operational amplifier 94 via a resistor R"1, possibly equal to R'1, and having its non-inverting input (+) connected to the output of operational amplifier 92 via a resistor R"2, possibly equal to R'2. Operational amplifier 100 supplies signal F2. The output of operational amplifier 100 is connected to the inverting input (−) by a block 102 providing a transfer function Z', possibly equal to Z. Unit 90 further comprises a multiplexer 104 controlled by signal swap and receiving signal F1 at a first input and signal F2 at a second input and supplying signal C1. According to an embodiment, unit 90 implements the first transfer function defined by operational amplifier 96, block 98 and resistors R'1 and R'2 when signal swap is in a first state, noted "0", and implements the second transfer function defined by operational amplifier 100, block 102 and resistors R"1 and R"2 when signal swap is in a second state, for example, a low state noted "1". The stable points of equilibrium of the feedback loop when it implements the first transfer function no longer correspond to stable points of equilibrium of the feedback loop when it implements the second transfer function and may correspond to unstable points of equilibrium of the feedback loop when it implements the second transfer function.

In the previous embodiment, the regulation implemented by control device 20 may correspond to a first transfer function or to a second transfer function. According to an embodiment, the regulation implemented by control device 20 may correspond to different transfer functions according to the state of the finite state machine modeling the operation of device 20.

What is claimed is:

1. A method of controlling a first heating element to heat a first multi-resonant microresonator of a multi-resonant optical device receiving K monochromatic input optical signals, K being an integer superior or equal to 1, the first multi-resonant microresonator comprising at least one first output capable of supplying a first output optical signal, the first multi-resonant microresonator having a first transfer function corresponding to a ratio of the power of the first output optical signal to the power of the monochromatic input optical signals according to temperature and having several first resonance peaks, wherein each first resonance peak comprises a rising side and a falling side according to the temperature, wherein a first sensor is capable of supplying a first measurement signal representative of at least part of a power of the first output optical signal, and wherein a first error signal equal to a difference between a first reference signal and the first measurement signal is determined, wherein, in a first mode, the first heating element is controlled by a first feedback loop to lead the first multi-resonant microresonator to operate at a first operating point on an initial first resonance peak among said first resonance peaks, said first operating point being a stable point of equilibrium of the first feedback loop in the first mode, a first signal for controlling the first heating element being determined in the first mode by the first feedback loop using a first regulation operation based on the first error signal and wherein, during a second mode, the first feedback loop is made diverging so that the first operating point no longer is a stable point of equilibrium of the first feedback loop, to lead the first multi-resonant microresonator to operate at a second operating point, said second operating point being a stable point of equilibrium of the first feedback loop in the second mode and no longer a stable point of equilibrium of the first feedback loop in the first mode, so that, during a subsequent first mode, the first multi-resonant microresonator is led to operate to a third operation point on a final first resonance peak among said first resonance peaks wherein the first final resonance peak is different than the initial first resonance peak, said third operating point being a stable point of equilibrium of the first feedback loop in the first mode, the first signal for controlling the first heating element being determined during the second mode by the first feedback loop using a second regulation operation based on the first error signal, the second regulation operation being obtained by modifying the first regulation operation.

2. The control method of claim 1, wherein the optical device further comprises a second multi-resonant microresonator, and a second heating element to heat the second multi-resonant microresonator, the second multi-resonant microresonator comprising at least one second output capable of supplying a second output optical signal, the second multi-resonant microresonator having a second transfer function corresponding to a ratio of the power of the second output optical signal to the power of the monochromatic input optical signals according to the temperature and having several second resonance peaks, wherein each second resonance peak comprises a rising side and a falling side according to the temperature, wherein a second sensor is capable of supplying a second measurement signal representative of at least part of a power of the second output optical signal, and wherein a second error signal equal to a difference between a second reference signal and the second measurement signal is determined, wherein, in a third mode, the second heating element is controlled by a second feedback loop to lead the second multi-resonant microresonator to operate at a fourth operating point on an initial second resonance peak among said second resonance peaks, said fourth operating point being a stable point of equilibrium of the second feedback loop in the third mode, a second signal for controlling the second heating element being determined in the third mode by the second feedback loop using a third regulation operation based on the second error signal and wherein, during a fourth mode, the third feedback loop is made diverging so that the fourth operating point no longer is a stable point of equilibrium of the second feedback loop, to lead the second multi-resonant microresonator to operate at a fifth operating point, said fifth operating point being a stable point of equilibrium of the second feedback loop in the fourth mode and no longer a stable point of equilibrium of the second feedback loop in the third mode, so that, during a subsequent third mode, the second multi-resonant microresonator is led to operate to a sixth operation point on a final second resonance peak among said second resonance peaks wherein the final second resonance peak is different than the initial second resonance peak, said sixth operating point being a stable point of equilibrium of the second feedback loop in the third mode.

3. The control method of claim 2, wherein, when a switching from the first mode to the second mode is detected for the first microresonator, the second feedback loop is led to operate in the fourth mode.

4. The control method of claim 2, wherein, the fourth regulation operation mode is obtained by inverting the sign of the second error signal compared to the third regulation operation.

5. The control method of claim 2, wherein the second reference signal is set to a third level during the third mode and wherein, during the fourth mode, the second reference signal is set to a fourth level different from the third level.

6. The control method of claim 2, wherein each second resonance peak comprises a rising side and a falling side, wherein all the stable points of equilibrium of the second feedback loop in the third mode are on the rising sides of the second resonance peaks or all the stable points of equilibrium of the second feedback loop in the third mode are on the falling sides of the second resonance peaks.

7. The control method of claim 6, wherein all the stable points of equilibrium of the second feedback loop in the fourth mode are on the falling sides of the second resonance peaks when all the stable points of equilibrium of the second feedback loop in the third mode are on the rising sides of the second resonance peaks or all the stable points of equilibrium of the second feedback loop in the fourth mode are on the rising sides of the second resonance peaks when all the stable points of equilibrium of the second feedback loop in the third mode are on the falling sides of the second resonance peaks.

8. The control method of claim 2, wherein one of the K monochromatic input optical signals is at a first wavelength, wherein said first operating point of the initial first resonance peak is at the first wavelength and wherein said sixth operating point of the final second resonance peak is at the first wavelength.

9. The control method of claim 2, wherein the first microresonator has a free spectral interval and wherein, between the first operating point and the third operating point, the first transfer function is shifted in wavelength by the ratio between the free spectral interval and K.

10. The control method of claim 9, wherein the interval between wavelengths of two monochromatic input optical signals among said K monochromatic input optical signals is substantially equal to the ratio between the free spectral interval and K.

11. The control method of claim 1, wherein all the stable points of equilibrium of the first feedback loop in the first mode are on the rising sides of the first resonance peaks or all the stable points of equilibrium of the first feedback loop in the first mode are on the falling sides of the first resonance peaks.

12. The control method of claim 11, wherein all the stable points of equilibrium of the first feedback loop in the second mode are on the falling sides of the first resonance peaks when all the stable points of equilibrium of the first feedback loop in the first mode are on the rising sides of the first resonance peaks or all the stable points of equilibrium of the first feedback loop in the second mode are on the rising sides of the first resonance peaks when all the stable points of equilibrium of the first feedback loop in the first mode are on the falling sides of the first resonance peaks.

13. The control method of claim 1, wherein one of the K monochromatic input optical signals is at a first wavelength, wherein said first operating point of the initial first resonance peak is at the first wavelength and wherein said third operating point of the final first resonance peak is at the first wavelength.

14. The control method of claim 1, wherein, the second regulation operation is obtained by inverting the sign of the first error signal compared to the first regulation operation.

15. The control method of claim 1, wherein a switching from the first mode to the second mode is performed when the first control signal is lower than a first threshold or higher than a second threshold.

16. The control method of claim 1, wherein the first reference signal is set to a first level during the first mode and wherein, during the second mode, the first reference signal is set to a second level different from the first level.

17. The control method of claim 1, wherein, when the first heating element is controlled to regulate at a high level of heating the first multi-resonant microresonator in the first mode, the first heating element is controlled to regulate at a low level of heating the first multi-resonant microresonator when passing in the second mode; and when the first heating element is controlled to regulate at the low level of heating the first multi-resonant microresonator in the first mode, the first heating element is controlled to regulate at the high level of heating the first multi-resonant microresonator when passing in the second mode.

* * * * *